United States Patent
Kim et al.

(10) Patent No.: US 9,001,938 B2
(45) Date of Patent: Apr. 7, 2015

(54) METHOD AND DEVICE FOR DETECTING RECEIVED SIGNAL USING MEDIAN ABSOLUTE DEVIATION

(71) Applicants: Samsung Electronics Co., Ltd., Suwon-si (KR); Industry-Academic Cooperation Foundation, Yonsei University, Seoul (KR)

(72) Inventors: Jong Han Kim, Suwon-si (KR); Un Sun Cho, Seoul (KR); Young Jun Hong, Seoul (KR); Joon Seong Kang, Suwon-si (KR); Jae Seok Kim, Seoul (KR); Chang Soon Park, Chungju-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/956,805

(22) Filed: Aug. 1, 2013

(65) Prior Publication Data

US 2014/0044222 A1 Feb. 13, 2014

(30) Foreign Application Priority Data

Aug. 7, 2012 (KR) .................. 10-2012-0086124

(51) Int. Cl.
  *H04B 1/12* (2006.01)
  *H04L 27/26* (2006.01)
(52) U.S. Cl.
  CPC . *H04B 1/12* (2013.01); *H04L 27/26* (2013.01)
(58) Field of Classification Search
  USPC .......... 375/147, 150, 152, 316, 340, 342, 343
  See application file for complete search history.

(56) References Cited

U.S. PATENT DOCUMENTS

| 5,600,673 | A | 2/1997 | Kimura et al. |
| 7,430,407 | B2 | 9/2008 | Smith |
| 2006/0203944 | A1* | 9/2006 | Kwak et al. .................. 375/343 |
| 2008/0118011 | A1* | 5/2008 | Trachewsky et al. ......... 375/343 |

FOREIGN PATENT DOCUMENTS

| JP | 3452817 B2 | 7/2003 |
| KR | 10-2009-0082743 A | 7/2009 |
| KR | 10-0935077 B1 | 12/2009 |
| KR | 10-1060392 B1 | 8/2011 |

* cited by examiner

*Primary Examiner* — Siu Lee
(74) *Attorney, Agent, or Firm* — NSIP Law

(57) ABSTRACT

A method of detecting a received signal, includes determining correlation between a received signal in a predetermined signal interval and training symbols, and determining a median absolute deviation (MAD) of the received signal in a predetermined reference interval. The method further includes detecting a presence of the received signal based on the correlation and the MAD.

18 Claims, 6 Drawing Sheets

METHOD AND DEVICE FOR DETECTING RECEIVED SIGNAL USING MEDIAN ABSOLUTE DEVIATION

CROSS-REFERENCE TO RELATED APPLICATION

This application claims the benefit under 35 USC 119(a) of Korean Patent Application No. 10-2012-0086124, filed on Aug. 7, 2012, in the Korean Intellectual Property Office, the entire disclosure of which is incorporated herein by reference for all purposes.

BACKGROUND

1. Field

The following description relates to a method and a device for detecting a received signal, using a median absolute deviation (MAD).

2. Description of Related Art

Detecting a presence of a received signal may be performed for a receiver of a wireless communication system to receive a signal properly. That is, the receiver may detect the presence of the received signal, and when the received signal is detected to be present, the receiver may acquire a synchronization with respect to the received signal.

Various methods of detecting a presence of a received signal may be performed. In examples, a method of detecting a presence of a received signal, using only a correlation function with respect to the received signal, may be performed, while a method of detecting a presence of a received signal based on energy of the received signal without using a correlation function, may also be performed. However, there is a need for a method of detecting a presence of a received signal to be able to achieve a high efficiency and to be suitable for a low-powered wireless communication system.

SUMMARY

In one general aspect, there is provided a method of detecting a received signal, the method including determining correlation between a received signal in a predetermined signal interval and training symbols, and determining a median absolute deviation (MAD) of the received signal in a predetermined reference interval. The method further includes detecting a presence of the received signal based on the correlation and the MAD.

In another general aspect, there is provided a device that detects a received signal, the device including a correlator configured to determine correlation between a received signal in a predetermined signal interval and training symbols, and a median absolute deviation (MAD) determining unit configured to determine an MAD of the received signal in a predetermined reference interval. The device further includes a detecting unit configured to detect a presence of the received signal based on the correlation and the MAD.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
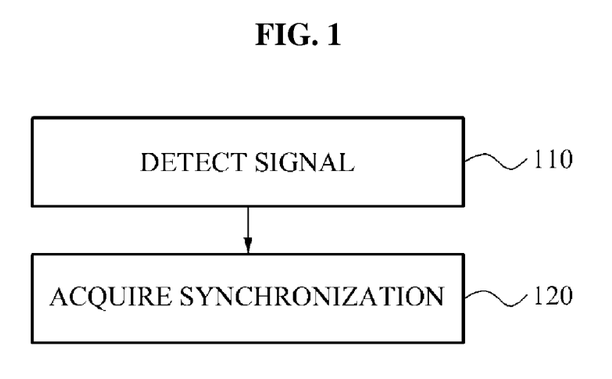
FIG. 1 is a flowchart illustrating an example of a method of detecting a received signal.

FIG. 1 is a flowchart illustrating an example of a method of detecting a received signal. The method of detecting the received signal is performed by a receiver in a wireless communication system. Referring to FIG. 1, in operation 110, the receiver detects a presence of the received signal, and in operation 120, the receiver acquires a time synchronization and a frame synchronization of the received signal.

In more detail, a transmitter in the wireless communication system may transmit, to the receiver, training symbols prior to transmitting a payload. The receiver may detect a received signal based on a correlation function. The training symbols may be predetermined such that correlation between the training symbols and noise is close to 0. Accordingly, when a phase between the received signal and the training symbols is matched, power of a pure signal may be calculated simultaneously by removing effects of the noise under a noisy circumstance.

In a first example, in a method of detecting the received signal based on the correlation function, when the training symbols including an N cycle or interval are transmitted, the correlation function may be represented by the following example of Equations 1:

$$\text{transmitted signal: } s(l) = \sum_{i=0}^{N} ts(l - iN) \text{ where } ts(i) = 0 \quad (1)$$

$$i < 0 \text{ and } i > N + 1$$

$$\text{received signal: } r(l) = s(l) + n(l)$$

$$\text{correlation function: } C(l) = \sum_{i=1}^{N} r(l+i-1)ts^*(i)$$

$$\operatorname*{argmax}_{l} [C(l)] = \sum_{i=1}^{N} ts(i)ts^*(i) + \sum_{i=1}^{N} n(k+i-1)ts^*(i) = \sum_{i=1}^{N} |ts(i)|^2$$

In Equations 1, n( ) denotes the noise, and ts( ) denotes the training symbols.

The receiver may compare a maximum value of the correlation function that is derived from Equations 1 with a predetermined threshold, and based on a result of the comparison, may determine the presence of the signal. However, actual power of the received signal may vary according to a power decrease due to a channel, a distortion of the receiver, and/or an amplification gain imbalance in the receiver, that is, an amplification gain that is not identical for each packet. Accordingly, the receiver may detect the received signal based on the following example of Equation 2:

$$D_1(l) = \frac{C(l)}{P(l)} \quad (2)$$

$$= \frac{\sum_{i=1}^{N} r(l+i-1)ts^*(i)}{\sum_{i=1}^{N} r(l+i-1)r^*(l+i-1)}$$

$$= \frac{\sum_{i=1}^{N} ts(l+i-1)ts^*(i) + \sum_{i=1}^{N} n(l+i-1)ts^*(i)}{\sum_{i=1}^{N} |ts(l+i-1)|^2 + \sum_{i=1}^{N} n(l+i-1)ts^*(l+i-1) + \sum_{i=1}^{N} n^*(l+i-1)ts(l+i-1) + \sum_{i=1}^{N} |n(l+i-1)|^2}$$

Referring to Equation 2, $D_f(l)$ denotes a ratio of average power P(l) of received signals to a value of the correlation function C(l). The average power of the received signals may be measured during cycle length multiples of the training symbols. Hereinafter, a length of a transmission symbol may correspond to a measured length of the average power.

When the correlation between the noise and the training symbols is close to 0, Equation 2 may be simplified as represented by following example of Equation 3:

$$D_1(l) = \frac{C(l)}{P(l)} \quad (3)$$

$$\cong \frac{\sum_{i=1}^{N} ts(l+i-1)ts^*(i)}{\sum_{i=1}^{N} |ts(l+i-1)|^2 + \sum_{i=1}^{N} |n(l+i-1)|^2}$$

Also, when a synchronization of the received signal and a synchronization of the training symbols are matched, $D_f(1_{peak})$, a maximum value of $D_f(l)$, may be represented by the following example of Equation 4:

$$D_1(l_{peak}) \cong \frac{\sum_{i=1}^{N} |ts(i)|^2}{\sum_{i=1}^{N} |ts(i)|^2 + \sum_{i=1}^{N} |n(l_{peak}+i-1)|^2} \cong \frac{P_S^2}{P_S^2 + \hat{\sigma}_N^2} > A_{th} \quad (4)$$

In Equation 4, $\hat{\sigma}_N$ denotes a sample average deviation in the N interval, a length of the noise, and $A_{th}$ denotes the predetermined threshold.

Figure 4:
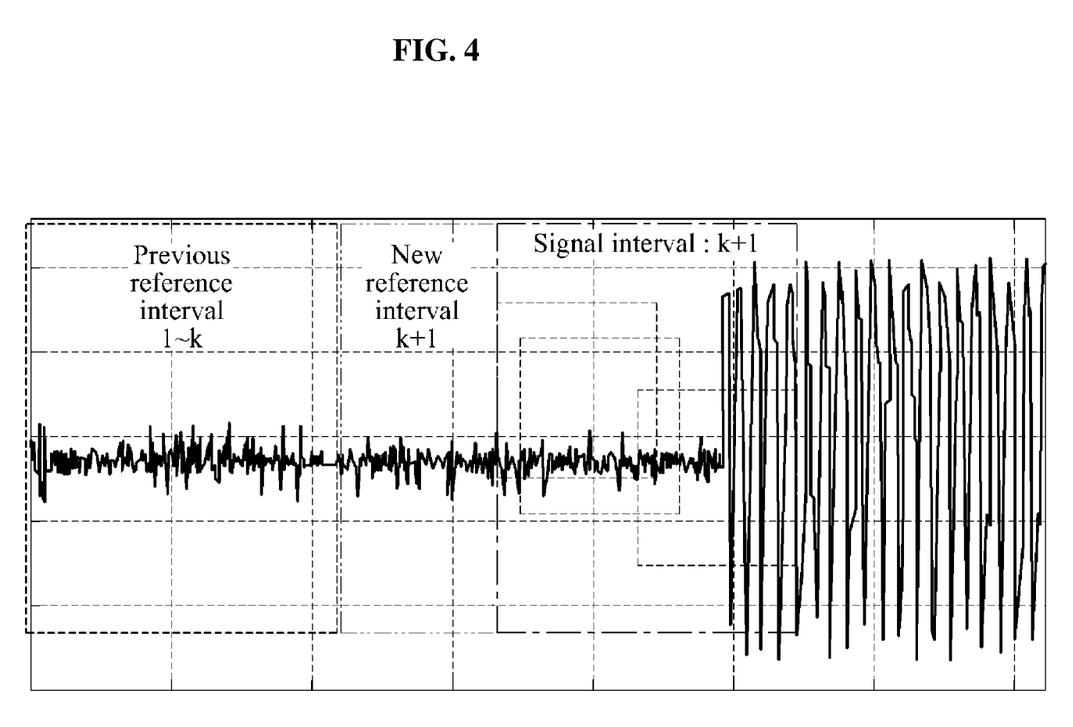
FIG. 4 is a graph illustrating another example of a reference interval and a signal interval with respect to a received signal.

Referring to FIG. 4, $D_f(1_{peak})$ may correspond to a signal-to-noise ratio (SNR) of a current received signal. $D_f(1_{peak})$ may also apply to an example when the correlation function is an auto-correlation function. That is, detecting the received signal based on the training symbols may correspond to calculating the SNR of the received signal, irrespective of the correlation function used.

A numerator of $D_f(l)$ denotes the correlation function C(l) of the received signal, while a denominator of $D_f(l)$ denotes the average power P(l) or energy of the received signal. Also, although the received signal of an identical interval is used to calculate the numerator and the denominator of $D_f(l)$, two adjacent intervals may be used to calculate the numerator and the denominator of $D_f(l)$. Hereinafter, an interval of the received signal used to calculate the numerator of $D_f(l)$ may be referred to as a reference interval, and an interval of the received signal used to calculate the denominator of $D_f(l)$ may be referred to as a signal interval.

In a second example, a method of detecting the received signal based on an energy of the received signal is described herein. Equations 3 and 4 may be used when the correlation between the training symbols and the noise is close to 0. However, an actual correlation between the training symbols and the noise may be relatively small, and not 0. To decrease the correlation between the training symbols and the noise, the cycle of the training symbols may be increased via complex designing of the training symbols may be needed. However, this may be inappropriate for a low-powered wireless communication system. To improve efficiency, the method of detecting the received signal based on the energy of the received signal, rather than the correlation function of the training symbols, may be used.

The method of detecting the received signal based on the energy of the received signal may include obtaining interval average energy in a corresponding interval, by integrating a square of the received signal during at least one interval. The method further includes comparing the interval average energy with a predetermined threshold, or comparing a ratio of average energy in several intervals with the predetermined threshold.

In more detail, a ratio of the energy of the received signal in the signal interval to the energy of the received signal in the reference interval may be represented by the following example of Equation 5:

$$D_E(l) = \frac{\sum_{i=1}^{N} |r(l+i-1)|^2}{\sum_{i=1}^{N} |r(l+i-N-1)|^2} \quad (5)$$

If only the noise exists in the reference interval that is prior to the presence of the received signal, and if a starting point of the received signal in the signal interval is accurate, that is, if a sample index 1 denotes a first sample of the received signal, Equation 5 may be represented by the following example of Equation 6:

$$D_E(l) = \frac{\sum_{i=1}^{N} |s(l+i-1)|^2 + \sum_{i=1}^{N} s(l+i-1)n^*(l+i-1) + \sum_{i=1}^{N} s^*(l+i-1)n(l+i-1) + \sum_{i=1}^{N} |n(l+i-1)|^2}{N\hat{\sigma}_N^2} \quad (6)$$

If the correlation between the transmitted signal and the noise is small enough to be inconsequential, Equation 6 may be represented by the following example of Equation 7:

$$D_E(l) \cong \frac{\sum_{i=1}^{N} |s(l+i-1)|^2 + \sum_{i=1}^{N} |n(l+i-1)|^2}{N\hat{\sigma}_N^2} = \frac{P_S^2 + \hat{\sigma}_N^2}{\hat{\sigma}_N^2} \quad (7)$$

Referring to Equation 7, if the correlation between the transmitted signal and the noise is small, the method of detecting the received signal based on the correlation function as shown in Equations 3 and 4 may be relatively identical to the method of detecting the received signal based on the energy of the received signal. However, if the correlation between the noise and the transmitted signal are large, both the method of detecting the received signal based on the correlation function and the method of detecting the received signal based on the energy of the received signal may return an inaccurate result. Moreover, a signal distortion, the DC offset of the received signal, and/or other facts known to one of ordinary skill in the art may lead to an inaccurate result, and if only the noise exists in the signal interval, the method of detecting the received signal based on the energy of the received signal as shown in Equation 7 may include a high probability of a false alarm occurring.

For example, the DC offset of the received signal may affect the method of detecting the received signal. If the DC offset $A_D$ is applied to the received signal, the received signal may be represented by the following example of Equation 8:

$$r(l) = s(l) + n(l) + A_D \quad (8)$$

Although the DC offset may change based on time, the DC offset may remain identical during reception of a single packet.

If the DC offset exists, $D_1(l)$ calculated in the method of detecting the received signal based on the correlation function, may be represented by the following example of Equation 9:

$$D_1(l) = \frac{C(l)}{P(l)} \quad (9)$$

$$= \frac{\sum_{i=1}^{N} [ts(l+i-1) + n(l+i-1) + A_D]ts^*(i)}{\sum_{i=1}^{N} [r(l+i-1) + A_D][r^*(l+i-1) + A_D]}$$

$$= \frac{\sum_{i=1}^{N} ts(l+i-1)ts^*(i) + \sum_{i=1}^{N} n(l+i-1)ts^*(i) + A_D \sum_{i=1}^{N} ts^*(i)}{\sum_{i=1}^{N} |r(l+i-1)|^2 + A_D \sum_{i=1}^{N} r^*(l+i-1) +}$$

$$A_D \sum_{i=1}^{N} r(l+i-1) + \sum_{i=1}^{N} A_D^2$$

$$= \frac{\sum_{i=1}^{N} ts(l+i-1)ts^*(i) + \sum_{i=1}^{N} n(l+i-1)ts^*(i) + A_D \sum_{i=1}^{N} ts^*(i)}{\sum_{i=1}^{N} |ts(l+i-1) + n(l+i-1)|^2 + A_D \sum_{i=1}^{N} ts^*(l+i-1) +}$$

$$n^*(l+i-1) + A_D \sum_{i=1}^{N} ts(l+i-1) + n(l+i-1) + NA_D^2$$

If the correlation between training symbols and the noise is close to 0, and a length of the reference interval is sufficiently long, an expected value of the noise may be assumed to be close to 0, and Equation 9 may be represented by the following example of Equation 10:

$$D_1(l) \cong \frac{\sum_{i=1}^{N} ts(l+i-1)ts^*(i) + A_D \sum_{i=1}^{N} ts^*(i)}{\sum_{i=1}^{N} |ts(l+i-1)|^2 + \sum_{i=1}^{N} |n(l+i-1)|^2 +} \quad (10)$$

$$A_D \sum_{i=1}^{N} ts^*(l+i-1) + A_D \sum_{i=1}^{N} ts(l+i-1) + NA_D^2$$

If the length of the reference interval is N, and a total of samples in the reference interval corresponds to the received signal, a sum of the training symbols in an interval, that is, a third term and a fourth term in a denominator of Equation 10, may not be related to a sample index 1. Further, if the sum of the training symbols is 0 during the cycle of the training symbols, Equation 10 may be represented by the following example of Equation 11:

$$D_1(l) \cong \frac{\sum_{i=1}^{N} ts(l+i-1)ts^*(i) + A_D \sum_{i=1}^{N} ts^*(i)}{\sum_{i=1}^{N} |ts(i)|^2 + \sum_{i=1}^{N} |n(l+i-1)|^2 +} \quad (11)$$

$$A_D \sum_{i=1}^{N} ts^*(i) + A_D \sum_{i=1}^{N} ts(i) + NA_D^2$$

$$= \frac{\sum_{i=1}^{N} ts(l+i-1)ts^*(i)}{\sum_{i=1}^{N} |ts(i)|^2 + \sum_{i=1}^{N} |n(l+i-1)|^2 + NA_D^2}$$

$D_1(l_{peak})$ deduced if the synchronization of the received signal and a synchronization of the transmission symbol are matched may be expressed by the following example of Equation 12:

$$D_1(l_{peak}) \cong \frac{\sum_{i=1}^{N} s(l_{peak}+i-1)s^*(i)}{\sum_{i=1}^{N} |r(l_{peak}+i-1)|^2 + NA_D^2} \quad (12)$$

$$= \frac{\sum_{i=1}^{N} |s(i)|^2}{\sum_{i=1}^{N} |s(i)|^2 + \sum_{i=1}^{N} |n(i)|^2 + NA_D^2}$$

$$= \frac{P_S^2}{P_S^2 + \sigma_N^2 + A_D^2} > A_{th}$$

Referring to Equation 12, although the correlation function, that is, a numerator of Equation 12, may not be related to the DC offset in the method of detecting the received signal, an energy component of the received signal, that is, a denominator of Equation 12, may be influenced by the DC offset. Accordingly, the DC offset may effect on the method of detecting the received signal based on the correlation function.

Also, if the DC offset exists, $D_E(l)$ calculated in the method of detecting the received signal based on the energy of the received signal, may be represented by the following example of Equation 13:

$$D_E(l) = \frac{\sum_{i=1}^{N} |r(l+i-1)|^2}{\sum_{i=1}^{N} |r(l+i-N-1)|^2} = \frac{\sum_{i=1}^{N} |r(l+i-1)+A_D|^2}{\sum_{i=1}^{N} |r(l+i-N-1)|+A_D^2} \quad (13)$$

If only the noise exists in the reference interval, and the received signal and the noise exist simultaneously in the signal interval, Equation 13 may be represented by the following example of Equation 14:

$$D_E(l) = \frac{\sum_{i=1}^{N} |ts(l+i-1)+n(l+i-1)+A_D|^2}{\sum_{i=1}^{N} |n(l+i-N-1)+A_D^2|} \quad (14)$$

$$= \frac{\sum_{i=1}^{N} |ts(l+i-1)+n(l+i-1)|^2 + A_D \sum_{i=1}^{N} ts^*(l+i-1) + n^*(l+i-1) + A_D \sum_{i=1}^{N} ts(l+i-1)+n(l+i-1) + \sum_{i=1}^{N} A_D^2}{\sum_{i=1}^{N} |n(l+i-1)|^2 + A_D \sum_{i=1}^{N} n^*(l+i-1) + A_D \sum_{i=1}^{N} n(l+i-1) + \sum_{i=1}^{N} A_D^2}$$

If an expected value of the correlation between the transmitted signal in the interval and the noise is close to 0 as shown above, Equation 14 may be represented by the following example of Equation 15:

$$D_E(l) \cong \frac{\sum_{i=1}^{N} |ts(l+i-1)+n(l+i-1)|^2 + NA_D^2}{\sum_{i=1}^{N} |n(l+i-1)|^2 + NA_D^2} \quad (15)$$

$$= \frac{\sum_{i=1}^{N} |ts(l+i-1)|^2 + \sum_{i=1}^{N} |n(l+i-1)|^2 + \sum_{i=1}^{N} n(l+i-1)ts^*(l+i-1) + \sum_{i=1}^{N} n^*(l+i-1)ts(l+i-1) + NA_D^2}{\sigma_N^2 + NA_D^2}$$

If the correlation between the transmitted signal and the noise is small enough to be inconsequential, Equation 15 may be represented by the following example of Equation 16:

$$D_E(l) \cong \frac{\sum_{i=1}^{N} |ts(l+i-1)|^2 + \sum_{i=1}^{N} |n(l+i-1)|^2 + NA_D^2}{\sigma_N^2 + NA_D^2} = \quad (16)$$

$$\frac{P_s^2 + \sigma_N^2 + A_D^2}{\sigma_N^2 + A_D^2} > A_{th}$$

In the method of detecting the received signal based on the energy of the received signal, differing from the method of detecting the received signal based on the correlation function, the DC offset is included in a denominator of Equation 16. That is, the method of detecting the received signal based on the energy of the received signal may receive less favorable effects on the DC offset than the method of detecting the received signal based on the correlation function. Also, if the DC offset of the signal interval and the DC offset of the reference interval are different, the method of detecting the received signal based on the energy of the received signal may return a less tolerable result. Further, a length of an interval corresponding to the interval average energy may need to be long in order for the interval average energy to be reliable, and this may be inappropriate in a system requiring low power.

Accordingly, the method of detecting the received signal based on the energy of the received signal may be restricted by the DC offset. A covariance in the reference interval may be employed to overcome such a restriction. That is, performance degradation may be prevented by using the covariance in the reference interval since the DC offset includes little influence over the covariance.

A difference between the covariance and the average energy of the received signal when the DC offset is present may be represented by the following example of Equation 17:

Received signal in reference interval: $r(l) = n(l) + A_D$ (17)

$$P(l) = \frac{1}{N} \sum_{i=1}^{N} |n(l+i-1)|^2 = \sum_{i=1}^{N} |n(l+i-1)+A_D|^2$$

$$\cong \frac{1}{N} \sum_{i=1}^{N} |n(k+i)|^2 + A_D^2$$

$$VAR(l) = \frac{1}{N} \sum_{i=1}^{N} |r(l+i-1)|^2 - \left(\frac{1}{N} \sum_{i=1}^{N} r(l+i-1)\right)^2$$

$$= \frac{1}{N} \sum_{i=1}^{N} |n(l+i-1)+A_D|^2 - \left(\frac{1}{N} \sum_{i=1}^{N} [n(l+i-1)+A_D]\right)^2$$

$$= \frac{1}{N} \sum_{i=1}^{N} |n(l+i-1)+A_D|^2 - \left(\frac{1}{N} \sum_{i=1}^{N} [n(l+i-1)+NA_D]\right)^2$$

$$\cong \frac{1}{N} \sum_{i=1}^{N} |n(l+i)|^2 + A_D^2 - A_D^2 = \frac{1}{N} \sum_{i=1}^{N} |n(l+i)|^2$$

Referring to Equation 17, although the covariance is present in the DC offset $A_D$, power of noise n(l) is properly illustrated. That is, although the average energy P(l) in the signal interval is influenced by the DC offset, the covariance VAR(l) in the reference interval may not be influenced by the DC offset. Also, when the transmitted signal is absent in the received signal, and only the noise and the DC offset exist in the reference interval, the covariance may be able to best represent power in a corresponding interval regardless of a size of the DC offset. That is, the covariance in the method of detecting the received signal may be suitable as a representative value for the reference interval that is free from influence of the DC offset. However, calculating the covariance may be highly complex. For example, when realizing hardware that calculates the covariance, a range of a quantization error is proportionate to an average of signals, that is, the DC offset, such that calculating the covariance may not be a most viable solution.

Calculating a median absolute deviation (MAD) in lieu of calculating the covariance may be a more appropriate alternative. That is, the MAD may be free from influence of the DC offset, similar to the covariance. Accordingly, the MAD may be used as the representative value for the reference interval, while needed a lower complexity than calculating the covariance.

In a third example, to prevent performance degradation due to the DC offset, a method of detecting the received signal based on the MAD may be performed. In more detail, a method of detecting the received signal based on the correlation function may not be performed properly, and a method of detecting the received signal based on the energy of the received signal may not be an appropriate solution. In addition, using the covariance as the representative value for the reference interval may be limited as described above. Accordingly, the examples described herein provide the method of detecting the received signal based on the MAD. That is, limits in the method of detecting the received signal based on the correlation function or the energy of the received signal, and the method of using the covariance as the representative value for the reference interval, may be overcome by using the MAD as the representative value for the reference interval.

The covariance in the reference interval may include a proportionate relationship with the MAD in the reference interval. Accordingly, the MAD in the reference interval may also represent the power of the noise. For example, if the noise includes a Gaussian distribution, the relationship between the covariance and the MAD may be represented by the following example of Equation 18:

$$\frac{MAD(l)}{\hat{\sigma}_N} = \sqrt{\frac{2}{\pi}}, \; MAD(l) = \hat{\sigma}_N \sqrt{\frac{2}{\pi}} \tag{18}$$

MAD(l) denotes the MAD in a corresponding interval.

The length of the reference interval may include a relationship with an accuracy of the MAD in the reference interval. For example, the length L of the reference interval that is a calculating subject of the MAD, may need to be greater than a predetermined value in order for a result of the MAD to be reliable. However, since an increase in the length L may indicate an increase in a calculating complexity and a size of a storage space, embodying a receiver with the length L may be made difficult. In this example, if L is less than the cycle N of the training symbols, a buffer used to calculate the correlation function of the training symbols may be shared for the calculation of the MAD. However, if L is greater than the cycle N of the training symbols, the calculation of the MAD, unlike the calculation of the covariance, may need an additional buffer. Accordingly, when embodying hardware, setting the length L to be identical to the cycle N may be more efficient. Nonetheless, if the length L of the reference interval for the MAD is fixed to the cycle N of the training symbols, an accuracy of the MAD may be reduced.

An average of MADs in respective intervals may be calculated and used, subsequent to calculating the MAD in each of the intervals, in order to improve the accuracy of the MAD without the additional buffer. That is, a reliability of the MAD may be achieved by calculating and using the average of the MADs in respective intervals, without increasing the calculation length of the MAD.

The method of using the covariance and the method of using the MAD or the average of the MADs may be compared. In more detail, the received signal may include a dynamic range M. If a number of output bits of an analog-to-digital converter (ADC) is b, a range and a covariance of a quantization noise $\varepsilon$ of the ADC are represented by the following example of Equation 19, provided that the quantization noise may be uniformly distributed:

$$0 < r(k) < M \tag{19}$$

$$-\frac{M}{2^b} < \varepsilon < \frac{M}{2^b}, \sigma_\varepsilon^2 = \frac{M^2}{12 \cdot 2^{2b}}$$

A sample covariance $\hat{\sigma}_N^2$ may be calculated based on the following example of Equation 20:

$$\hat{\sigma}_N^2 = \frac{1}{N} \sum_{i=1}^{N} |r(k+i)|^2 - (\hat{\mu}_n)^2 \tag{20}$$

$$\tilde{\sigma}_N^2 = \frac{1}{N} \sum_{i=1}^{N} |r(k+i)|^2 - (\tilde{\mu}_n)^2 = \frac{1}{N} \sum_{i=1}^{N} |r(k+i)|^2 - (\hat{\mu}_n + e_q)^2$$

$$= \frac{1}{N} \sum_{i=1}^{N} |r(k+i)|^2 - \hat{\mu}_N^2 - 2e_q \hat{\mu}_n - e_q^2$$

$$= \hat{\sigma}_N^2 - 2e_q \hat{\mu}_n - e_q^2$$

Referring to Equation 20, $\hat{\mu}_n$ denotes a sample average. In realizing hardware for Equation 20, the sample average may be quantized to a fixed decimal point, and included in the calculation. Accordingly, $\tilde{\mu}_n$ may denote the sample average of fixed decimal points, $\tilde{\sigma}_N^2$ may denote a covariance calculated based on $\tilde{\mu}_n$, and $e_q$ denotes the quantization noise in this example.

When a total of ADC outputs is an integer, and only an integer portion of the sample average is quantized, a range of the quantization noise may be represented by $0.5 < e_q < 0.5$. When this is applied to Equation 20, a range of an output difference between the sample covariance and an actual hardware carburetor may be represented by the following example of Equation 21:

$$-0.25 - \hat{\mu}_n < \hat{\sigma}_n^2 - \tilde{\sigma}_n^2 = 2e_q \hat{\mu}_n + e_q^2 < 025 + \hat{\mu}_n \tag{21}$$

When a result of obtaining the range is analyzed, a range of error may be proportionate to the sample average. That is, as the sample average increases, the range of the error also increases. The error is due to a quantization of the sample average only, and when the quantization error of a result of calculating $E(x^2)$ is included, the error may be further increased.

A sample MAD $\hat{M}(k)$ may be calculated based on the following example of Equation 22:

$$\hat{M}(k) = \frac{1}{N} \sum_{i=L}^{L} |r(k+i) - \hat{\mu}_k| = \frac{1}{N} \sum_{i=L}^{L} |n(k+i)| \tag{22}$$

When an error of the sample average is absent, a right-hand side of Equation 22 may be satisfied. When the fixed decimal point sample average is applied to the calculation as in an example of the covariance, and an inequality is applied to the separate $e_q$, the sample MAD $\hat{M}(k)$ may be calculated based on the following example of Equation 23:

$$\hat{M}(k) = \frac{1}{N} \sum_{i=L}^{L} |r(k+i) - \hat{\mu}_k| = \frac{1}{N} \sum_{i=L}^{L} |n(k+i) - e_q| \tag{23}$$

$$\sum_{i=L}^{L} |n(k+i) - e_q| \geq \frac{1}{N} \sum_{i=L}^{L} |n(k+i)| - |e_q| = \hat{M}(k) - \frac{1}{N} \sum_{i=L}^{L} |e_q|$$

That is, in the method of using the MAD, a range of a calculation error due to the quantization error of the fixed decimal point sample average may be fixed to a constant unlike the covariance. When the total of the ADC outputs is an integer identical to an example of the covariance, and the integer portion of the sample average is quantized, the calculation error in the method of using the MAD may be less than or equal to 0.5 as represented by the following example of Equation 24. When the average is greater than or equal to 0.25, an error in the method of using the MAD may include a smaller error than in the method of using the covariance.

$$0.5 \geq \frac{1}{N} \sum_{i=L}^{L} |e_q| \geq \hat{M}(k) - \tilde{M}(k) \qquad (24)$$

A hardware complexity (e.g., a size of a storage buffer) between a method of using an MAD and a method of using a covariance may be compared. In the method of using the covariance, storing a received signal may be unnecessary since a calculation may be conducted for each sample. However, in the method of using the MAD may need a buffer to store an "N" number of samples. Nonetheless, since the buffer used to calculate the correlation function may be shared in the method of using the MAD, the additional buffer may not be required.

Also, in the method of using the covariance, there exists a need for a multiplier and an accumulator to realize a summation. In the method of using the MAD, only the accumulator used to realize the summation is needed. Accordingly, an increase of complexity due to the multiplier is restricted, and a bit-width of a calculator used to accumulate a result of the multiplication may be decreased.

Further, in the method of using the covariance, the bit-width may be greater. Since the method of using the MAD may accumulate a difference between the received signal and an average only, although an input bit-width of accumulation is identical to a bit-width of the received signal, saturation or truncation is unlikely to occur. A probability of an occurrence of the saturation may be dependent on a covariance of noise.

However, in the method of using the covariance, an input of accumulation may be a square of the received signal that is greater than the received signal, and as the square of the received signal is a positive integer, the bit-width may increase in an accumulation process. Accordingly, aside from when a dynamic range of the received signal is considerably smaller than the bit-width, a bit-width greater than the bit-width of the received signal is needed. Rounding-off may need to be performed with respect to the square, or a result of the accumulation may need to be saturated in order to achieve the bit-width identical to the method of using the MAD. However, this may result in performance degradation.

Figure 2:
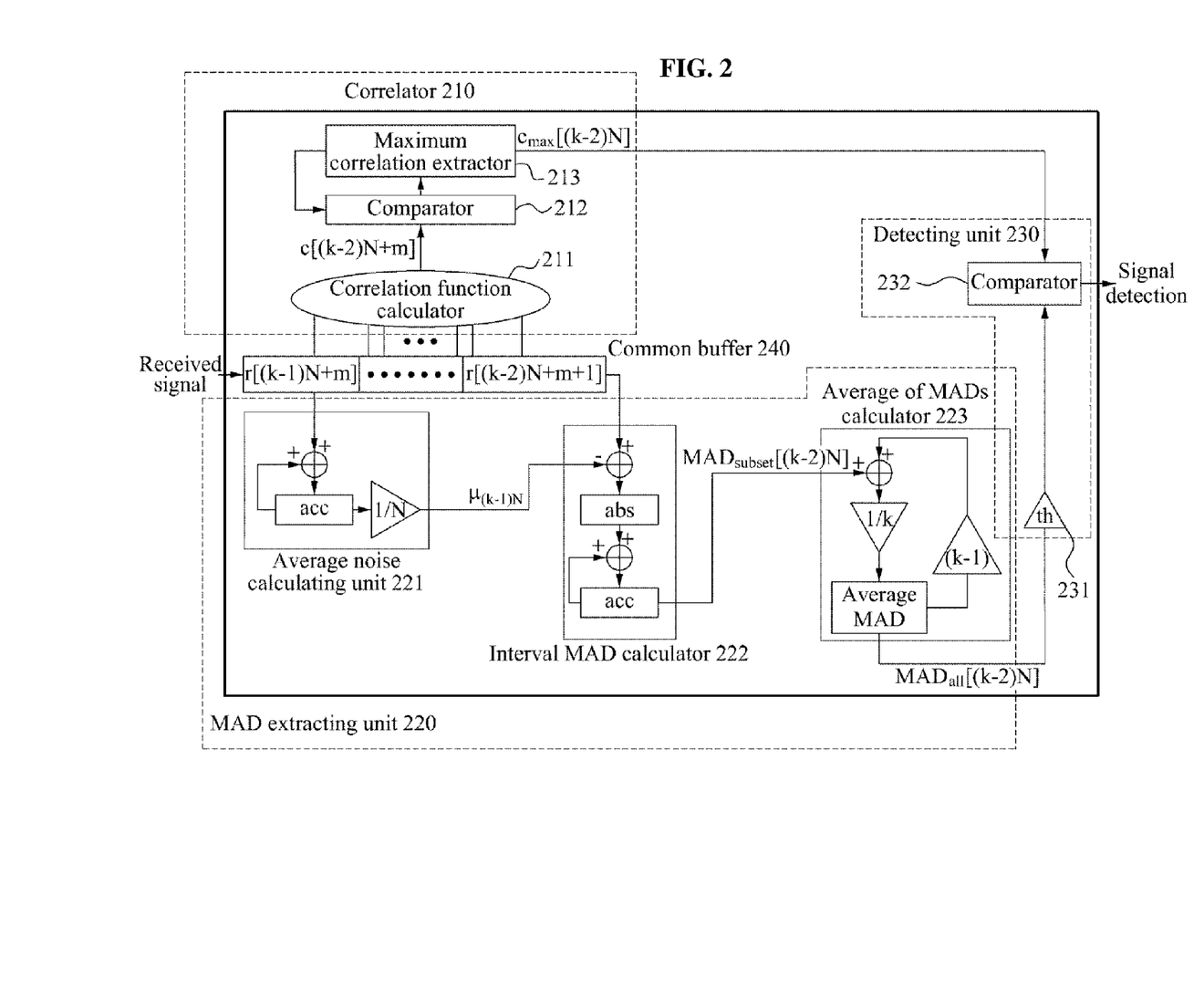
FIG. 2 is a block diagram illustrating an example of a device that detects a received signal.

FIG. 2 is a block diagram illustrating an example of a device that detects a received signal. Referring to FIG. 2, the device includes a correlator 210, an MAD determining unit 220, a detecting unit 230, and a common buffer 240.

The correlator 210 extracts a correlation value (e.g., maximum correlation value) between a received signal in a predetermined signal interval and training symbols. The correlator 210 includes a correlation function calculator 211, a comparator 212, and a maximum correlation extractor 213.

The correlation function calculator 211 receives the received signal stored in the common buffer 240, and calculates correlation values between the training symbols and the received signal. The comparator 212 compares the correlation values, and the maximum correlation extractor 213 extracts the maximum correlation value from among the correlation values based on a result of the comparison. The predetermined signal interval may include calculation intervals of an identical length, and the correlator 210 may extract the maximum correlation from among the correlation values calculated in each of the calculation intervals.

Also, the correlator 210 may calculate the correlation value (e.g., maximum correlation value) between the received signal and the training symbols based on a code of each of the received signal and the training symbols. In more detail, k denotes an interval index, N denotes a length of an interval, m denotes a sample index in the interval, and kN+m denotes a total number of samples. The received signal stored in the common buffer 240 is represented as r[(k−2)N+m+1] ~r[(k−1)N+m].

The correlation function calculator 211 may correlate the code of each of the received signal and the training symbols to generate a correlation function $C_s(l)$, as represented by the following example of Equations 25:

$$C_s(l) = \sum_{i=1}^{N} [s(l+i-1) + n(l+i-1) + A_D] \frac{s^*(i)}{|s(i)|} \qquad (25)$$

$$= \sum_{i=1}^{N} \frac{s(l+i-1)s^*(i)}{|s(i)|} + \frac{1}{N} \sum_{i=1}^{N} \frac{n(l+i-1)s^*(i)}{|s(i)|} + \frac{A_D}{N} \sum_{i=1}^{N} \frac{s^*(i)}{|s(i)|}$$

$$= \sum_{i=1}^{N} \frac{s(l+i-1)s^*(i)}{|s(i)|} + \frac{1}{N} \left( \sum_{k_+} n(l+k_+ - 1) - \sum_{k_-} n(l+k_- - 1) \right) + \frac{A_D}{N} \sum_{i=1}^{N} \frac{s^*(i)}{|s(i)|}$$

$$K_p = \{k_+ \mid s(k_+) > 0, 1 \leq k_+ \leq N\}$$
$$K_m = \{k_- \mid s(k_-) < 0, 1 \leq k_- \leq N\}$$

Referring to Equations 25, $k_+$ denotes an interval index when the training symbols are a positive integer, and $k_-$ denotes an interval index when the training symbols are a negative integer. If N is sufficiently large, an expected value of noise may be 0, and Equations 25 may be simplified as represented by the following example of Equation 26:

$$C_s(l) \cong \sum_{i=1}^{N} \frac{s(l+i-1)s^*(i)}{|s(i)|} + \frac{A_D}{N} \sum_{i=1}^{N} \frac{s^*(i)}{|s(i)|} \qquad (26)$$

Also, if sizes of $K_p$ and $K_m$ are identical, a last term of Equation 26 may be 0, as represented by the following example of Equation 27:

$$C_s(l) \cong \sum_{i=1}^{N} \frac{s(l+i-1)s^*(i)}{|s(i)|} \qquad (27)$$

If a synchronization of the received signal and a synchronization of the training symbols are matched, the maximum correlation extractor 213 may calculate the maximum correlation value $C_s(l_{peak})$, as represented by the following example of Equation 28.

$$C_s(l_{peak}) \cong \sum_{i=1}^{N} \frac{s(i)s^*(i)}{|s(i)|} = \frac{1}{N}\sum_{i=1}^{N}|s(i)| \qquad (28)$$

Referring to Equation 28, the maximum correlation value $C_s(l_{peak})$ is not influenced by an DC offset. Accordingly, the correlator 210 may extract, from among the correlation values, or calculate, the maximum correlation value $C_{max}((k-2)N)$ in the signal interval $[kN+1, (k+1)N]$.

The MAD determining unit 220 extracts an MAD in a predetermined reference interval. That is, the MAD determining unit 220 calculates an average of MADs in previous reference intervals and the predetermined reference interval, respectively. Also, the MAD determining unit 220 may update the average of the MADs based on a new MAD in a new reference interval. The new MAD in the new reference interval may be applied to the average of the MADs based on a length of the predetermined reference interval or the previous reference interval. The MAD determining unit 220 includes an average noise calculating unit 221, an interval MAD calculator 222, and an average of MADs calculator 223.

The average noise calculating unit 221 includes an adder, an accumulator (acc), and a divider. The average noise calculating unit 221 calculates an average noise $\mu_{(k-1)N}$ of received signals in a current reference interval $[(k-1)N+1, kN]$.

The interval MAD calculator 222 includes an adder, an absolute value executor (abs), and an accumulator (acc). The interval MAD calculator 222 calculates a current MAD $MAD_{subset}((k-2)N)$ in the current reference interval based on the average noise of the received signals.

The average of MADs calculator 223 includes an adder, a divider, an averager, and a multiplier. The average of MADs calculator 223 calculates an average $MAD_{all}((k-2)N)$ of a previous MAD in a previous reference interval and the current MAD in the current reference interval. That is, the average of MADs calculator 223 calculates the average $MAD_{all}((k-2)N)$ of MADs in a total of reference intervals up to a present time, and provides the average $MAD_{all}((k-2)N)$ of the MADs to the detecting unit 230.

The detecting unit 230 includes a multiplier 231 and a comparator 232. The multiplier 231 multiplies the average $MAD_{all}((k-2)N)$ of the MADs in the total of the reference intervals up to the present time by a predetermined threshold (th). The comparator 232 determines whether the received signal exists (e.g., performs signal detection) based on an output of the multiplier 231 and an output of the correlator 210.

In more detail, the comparator 232 compares the maximum correlation value and the output of the multiplier 231. When the maximum correlation value in the signal interval k is $C_{max}(kN)$, and the average of the MADs in the total of the reference intervals, including the previous reference intervals and a reference interval k, is $MAD_{all}(kN)$, the comparator 232 compares the $C_{max}(kN)$ and the $MAD_{all}(kN)$ multiplied by the threshold th, as represented by the following example of Equation 29. That is, the comparator 232 determines whether a ratio $D(kN)$ of the $MAD_{all}(kN)$ to the $C_{max}(kN)$ is greater than the predetermined threshold th. When the $D(kN)$ is greater than the th as shown in Equation 29, the received signal is determined or detected to be present and to be further processed. Conversely, when the $D(kN)$ is less than the th, the signal is determined to be absent and to not be further processed.

$$D(kN) = \frac{C_{max}(kN)}{MAD_{all}(kN)} \lessgtr th \Rightarrow C_{max}(kN) \lessgtr th \cdot MAD_{all}(kN) \qquad (29)$$

$$D(kN) = $$

$$\frac{C_{max}(kN)}{MAD_{all}(kN)} = \frac{\underset{m}{\mathrm{argmax}}[C(kN+m)]}{\frac{1}{k}[(k-1)MAD_{all}[(k-1)N] + MAD_{subset}(kN)]}$$

$$C(kN+m) = \left[\sum_{i=0}^{N-1}[r(kN+m+i)]\frac{s^*(i)}{|s(i)|}\right]$$

$$MAD_{subset}(kN) = \sum_{i=(k-1)N+1}^{kN}|r(i) - \mu_{kN}|$$

$$\mu_{kN} = \frac{1}{N}\sum_{i=(k-1)N+1}^{kN}r(i)$$

Also, whenever the reference interval is updated, storing averages $MAD_{all}[N], \ldots, MAD_{all}[(k-1)N]$ of MADs in respective previous reference intervals that may be used to calculate the average $MAD_{all}(kN)$ of the MADs in the total of the reference intervals, including the previous reference intervals and the current reference interval, may be inefficient. Further, as the interval index k increases, space needed to store such values may also increase. Accordingly, the average of MADs calculator 223 may calculate or update the average $MAD_{all}(kN)$ of the MADs based on a new or current MAD in a new or current reference interval. In other words, the new MAD in the new reference interval may be applied to the average of the MADs in respective previous reference intervals based on the length of a predetermined reference interval or a previous reference interval.

Accordingly, when calculating the average $MAD_{all}(kN)$ of the MADs, the current MAD $MAD_{subset}((k-2)N)$ in the current reference interval $[(k-1)N+1, kN]$ may be calculated, and subsequently, may be applied to a previous average $MAD_{all}[(k-1)N]$ of MADs in a total of the reference intervals, including the previous reference intervals, as represented by the following example of Equation 30:

$$MAD_{all}(kN) = \frac{1}{k}\sum_{j=1}^{k}\sum_{i=(j-1)N+1}^{jN}\left|r(i) - \left(\frac{1}{N}\sum_{i=(j-1)N+1}^{jN}r(i)\right)\right| \qquad (30)$$

$$= \frac{1}{k}\left[\frac{k-1}{k-1}\sum_{j=1}^{k-1}\sum_{i=(j-1)N+1}^{jN}\left|r(i) - \left(\frac{1}{N}\sum_{i=(j-1)N+1}^{jN}r(i)\right)\right| + \sum_{i=(k-1)N+1}^{kN}\left|r(i) - \left(\frac{1}{N}\sum_{i=(k-1)N+1}^{kN}r(i)\right)\right|\right]$$

$$= \frac{1}{k}[(k-1)MAD_{all}[(k-1)N] + \sum_{i=(k-1)N+1}^{kN}\left|r(i) - \left(\frac{1}{N}\sum_{i=(k-1)N+1}^{kN}r(i)\right)\right|]$$

$$= \frac{1}{k}[(k-1)MAD_{all}[(k-1)N] + MAD_{subset}(kN)]$$

$$MAD_{subset}(kN) = \sum_{i=(k-1)N+1}^{kN} |r(i) - \mu_{kN}|$$

Figure 3:
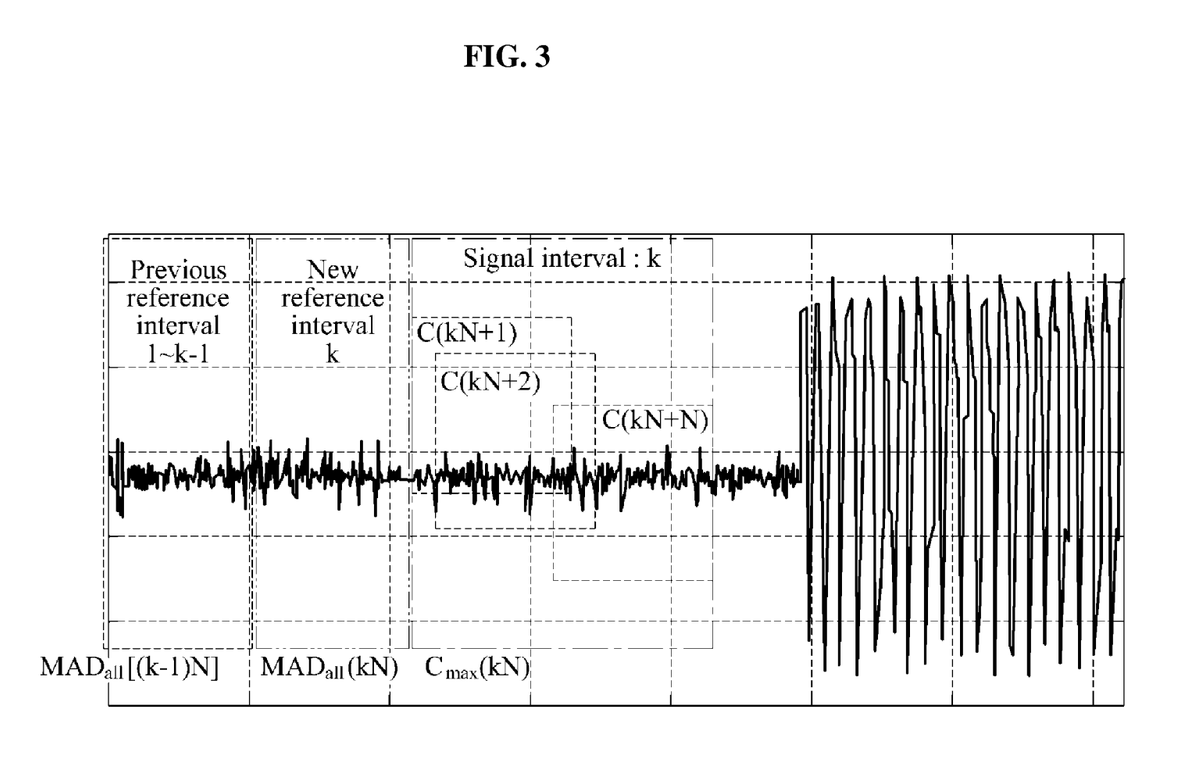
FIG. 3 is a graph illustrating an example of a reference interval and a signal interval with respect to a received signal.

FIG. 3 is a graph illustrating an example of a reference interval and a signal interval with respect to a received signal. Referring to FIG. 3, an interval index that represents a present time is k. That is, when the interval index is k, a new reference interval k is newly set, and a previous reference interval k−1 is present. The reference interval may include the new reference interval and the previous reference interval.

An average of MADs of the new reference interval is expressed as $MAD_{all}(kN)$, and an average of MADs of the previous reference interval is expressed as $MAD_{all}((k-1)N)$. The signal interval k includes calculation intervals, each including a length of kN. For example, as shown in FIG. 3, three dotted boxes indicate three calculation intervals in the signal interval k with correlation values C(kN+1), C(kN+2), and C(kN+N), respectively. Among the correlation values C(kN+1), C(kN+2), and C(kN+N), a maximum correlation value $C_{max}(kN)$ is extracted from therein.

FIG. 4 is a graph illustrating another example of a reference interval and a signal interval with respect to a received signal. Referring to FIG. 4, when an interval index is updated from k to k+1, a previous reference interval k is present, and a new reference interval k+1 is newly set. The new reference interval k+1 may be identical to the calculation interval C(kN+1) of FIG. 3. The signal interval k+1 is also newly set.

Figure 5:
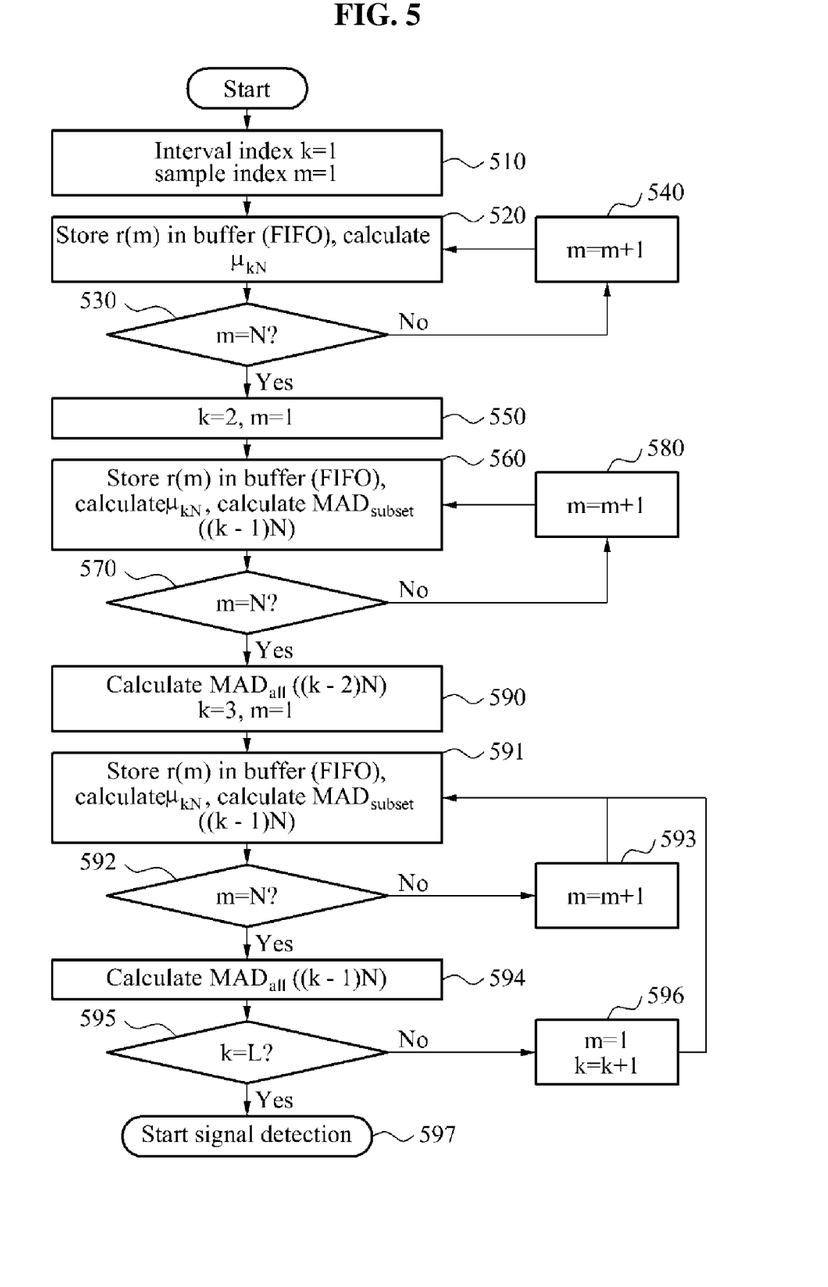
FIG. 5 is a flowchart illustrating an example of a method of initializing a method of detecting a received signal.

FIG. 5 is a flowchart illustrating an example of a method of initializing a method of detecting a received signal. A length L of a reference interval may be set so that an accuracy of an MAD may be less than a desired accuracy. For example, when a cycle N of training symbols is 48, the length L is greater than or equal to 6.

In operation 510, each of an interval index k and a sample index m is set to 1. In operation 520, a received signal r(m) is stored in a buffer (e.g., a FIFO buffer), and an average interval noise $\mu_{kN}$ of the received signal r(m) is calculated. In operation 530, whether the sample index m is equal to the cycle N of the training symbols is determined. If the sample index m is determined to be not equal to the cycle N of the training symbols, the method continues in operation 540. Otherwise, the method continues in operation 550.

In operation 540, the sample index m is updated to m+1, and the method returns to operation 520. In operation 550, the interval index k is set to 2, and the sample index m is set to 1. In operation 560, the received signal r(m) is stored in the buffer, the average interval noise $\mu_{kN}$ of the received signal r(m) is calculated, and a MAD $MAD_{subset}((k-1)N)$ is calculated based on the average interval noise $\mu_{kN}$. In operation 570, whether the sample index m is equal to the cycle N of the training symbols is determined. If the sample index m is determined to be not equal to the cycle N of the training symbols, the method continues in operation 580. Otherwise, the method continues in operation 590.

In operation 580, the sample index m is updated to m+1, and the method returns to operation 560. In operation 590, an average $MAD_{all}((k-2)N)$ of MADs is calculated based on the MAD $MAD_{subset}((k-1)N)$, the interval index k is set to 3, and the sample index m is set to 1. In operation 591, the received signal r(m) is stored in the buffer, an average interval noise $\mu_{kN}$ of the received signal r(m) is calculated, and the $MAD_{subset}((k-1)N)$ is calculated based on the average interval noise $\mu_{kN}$. In operation 592, whether the sample index m is equal to the cycle N of the training symbols is determined. If the sample index m is determined to be not equal to the cycle N of the training symbols, the method continues in operation 593. Otherwise, the method continues in operation 594.

In operation 593, when the sample index m is updated to m+1, and the method returns to operation 591. In operation 594, the average $MAD_{all}((k-1)N)$ of the MADs is calculated based on the MAD $MAD_{subset}((k-1)N)$. In operation 595, whether the interval index k is equal to the length L of the reference interval is determined. If the interval index k is determined to be not equal to the length L of the reference interval, the method continues in operation 596. Otherwise, the method continues in operation 597. In operation 596, the sample index m is set to 1, and the interval index k is set to k+1, and the method returns to operation 591. In operation 597, a signal detection is started or initiated.

Figure 6:
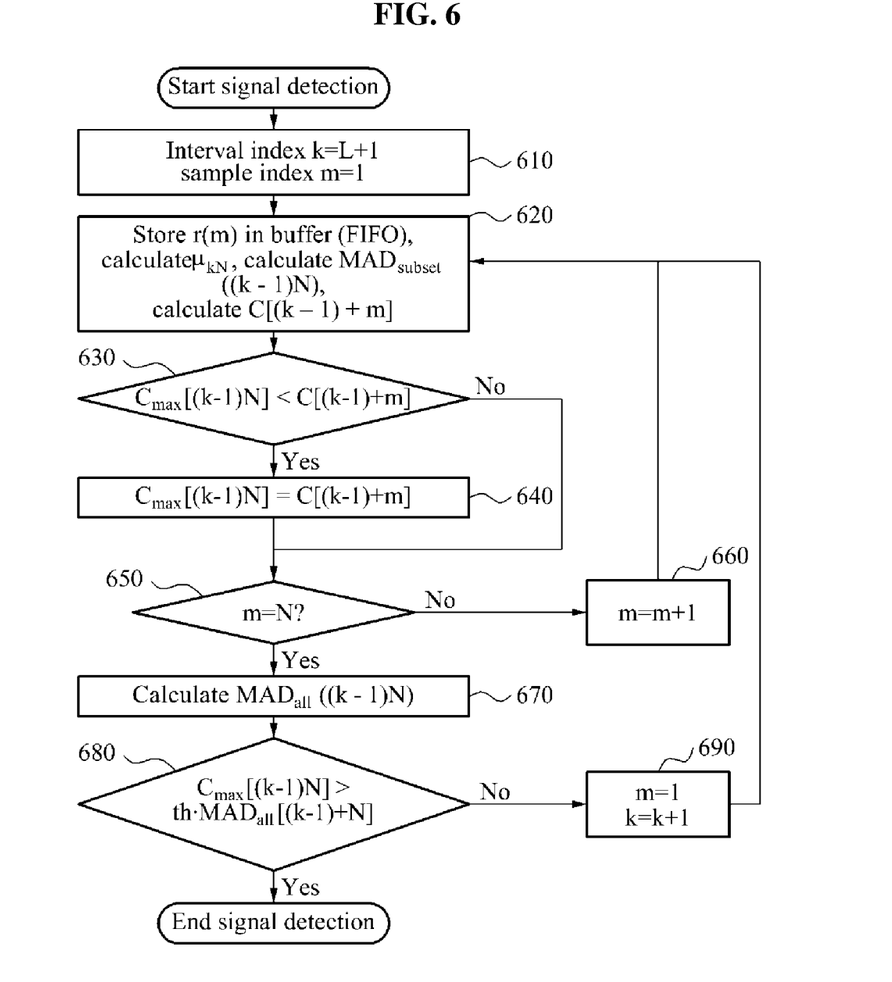
FIG. 6 is a flowchart illustrating another example of a method of detecting a received signal.

FIG. 6 is a flowchart illustrating another example of a method of detecting a received signal. The method of detecting the received signal is performed for each kN rather than each sample. The sample index m may include a value from 1 to a cycle N of training symbols. Accordingly, a signal interval in an interval index k may be [kN+1, (k+2)N−1], and a total of reference intervals may be [1, kN]. A ratio D(kN) of a maximum correlation value $C_{max}$, among N correlation values, to an average of MADs, is compared to a predetermined threshold, and based on a result of the comparison, a presence of the received signal is determined or detected. A point of time at which the received signal is detected is subsequent to receiving a ((k+2)N−1)-th sample.

Referring to FIG. 6, in operation 610, the interval index k is set to L+1, and a sample index m is set to 1. L denotes a length of a reference interval. In operation 620, a received signal r(m) of a sample index m is stored in a buffer (e.g., a FIFO buffer), an average interval noise $\mu_{kN}$ of the received signal r(m) is calculated, a $MAD_{subset}((k-1)N)$ is calculated, and a correlation value C[(k−1)+m] is calculated. By iterating operations 630 through 660, a maximum correlation value $C_{max}[(k-1)+m]$ is calculated.

In more detail, in operation 630, whether the previously-calculated maximum correlation value $C_{max}[(k-1)+m]$ is less than the correlation value C[(k−1)+m] is determined. If the maximum correlation value $C_{max}[(k-1)+m]$ is determined to be less than the correlation value C[(k−1)+m], the method continues in operation 640. Otherwise, the operation continues in operation 650. In operation 640, the maximum correlation value $C_{max}[(k-1)+m]$ is set to the correlation value C[(k−1)+m].

In operation 650, whether the sample index m is equal to the cycle N of the training symbols is determined. If the sample index m is determined to be not equal to the cycle N of the training symbols, the method continues in operation 660. Otherwise, the method continues in operation 670. In operation 660, the sample index m is updated to m+1, and the method returns to operation 620.

In operation 670, an average $MAD_{all}((k-1)N)$ of MADs is calculated based on the MAD $MAD_{subset}((k-1)N)$. In operation 680, whether the ratio of the maximum correlation value $C_{max}[(k-1)+m]$ to the average $MAD_{all}((k-1)N)$ of the MADs is greater than a predetermined threshold th is determined. If the ratio of the maximum correlation value $C_{max}[(k-1)+m]$ to the average $MAD_{all}((k-1)N)$ of the MADs is determined to be not greater than the predetermined threshold th, the method continues in operation 690. Otherwise, the received signal is determined or detected to be present and to be further processed, and the method ends. In operation 690, the sample index m is set to 1, and the interval index k is set to k+1, and the method returns to operation 620.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a received signal, the method comprising:

determining correlation between a wireless received signal in a predetermined signal interval and training symbols;

determining a median absolute deviation (MAD) of the wireless received signal in a predetermined reference interval; and detecting a presence of the wireless received signal based on the correlation and the MAD.

2. The method of claim 1, further comprising:
calculating a maximum correlation between the wireless received signal in the predetermined signal interval and the training symbols.

3. The method of claim 1, further comprising:
calculating correlations between the wireless received signal in respective calculation intervals in the predetermined signal interval, and the training symbols, each of the calculation intervals comprising an identical length; and extracting a maximum correlation from the correlations.

4. The method of claim 1, further comprising:
calculating an average of MADs in previous reference intervals and the predetermined reference interval, respectively; and detecting a presence of the wireless received signal based on a ratio of the correlation to the average of the MADs.

5. The method of claim 4, further comprising:
detecting the presence of the wireless received signal in response to the ratio of the correlation to the average of the MADs being greater than a predetermined threshold.

6. The method of claim 1, further comprising:
updating an average of MADs in respective previous reference intervals based on the MAD in the predetermined reference interval to calculate an average of the MADs in the previous reference intervals and the predetermined reference interval, respectively.

7. The method of claim 6, further comprising:
applying an MAD in a new reference interval to the average of the MADs in the previous reference intervals and the predetermined reference interval based on a length of the predetermined reference interval.

8. The method of claim 1, further comprising:
calculating the correlation between the wireless received signal and the training symbols based on a code of each of the wireless received signal and the training symbols.

9. The method of claim 1, further comprising, when a cycle of the training symbols is N, and a length of the predetermined reference interval is kN, k being a positive integer:
determining the MAD in the predetermined reference interval for each kN point.

10. The method of claim 9, wherein when the predetermined reference interval is [1, kN], the predetermined signal interval is [kN+1, (k+2)N−1].

11. A non-transitory computer-readable storage medium storing a program comprising instructions to cause a computer to perform the method of claim 1.

12. A device that detects a received signal, the device comprising:
a correlator configured to determine correlation between a received signal in a predetermined signal interval and training symbols;

a median absolute deviation (MAD) determining unit configured to determine an MAD of the received signal in a predetermined reference interval; and a detecting unit configured to detect a presence of the received signal based on the correlation and the MAD.

13. The device of claim 12, further comprising:
a common buffer configured to store the received signal,
wherein the correlator and the MAD determining unit are further configured to receive the received signal from the common buffer.

14. The device of claim 12, wherein the correlator further comprises:
a maximum correlation extractor configured to calculate a maximum correlation between the received signal in the predetermined signal interval and the training symbols.

15. The device of claim 12, wherein the correlator further comprises:
a correlation function calculator configured to calculate correlations between the received signal in respective calculation intervals in the predetermined signal interval, and the training symbols, each of the calculation intervals comprising an identical length; and a maximum correlation extractor configured to extract a maximum correlation from the correlations.

16. The device of claim 12, wherein the MAD determining unit comprises:
an average of MADs calculator configured to calculate an average of MADs in previous reference intervals and the predetermined reference interval, respectively.

17. The device of claim 16, wherein the detecting unit is further configured to:
detect a presence of the received signal based on a ratio of the correlation to the average of the MADs.

18. The device of claim 17, wherein the detecting unit is further configured to:
determine that the received signal is absent in response to the ratio of the correlation to the average of the MADs being less than or equal to a predetermined threshold.

* * * * *